J. A. SNEE.
METHOD OF PRODUCING CARBON BLACK.
APPLICATION FILED SEPT. 20, 1911.
1,036,362.
Patented Aug. 20, 1912.
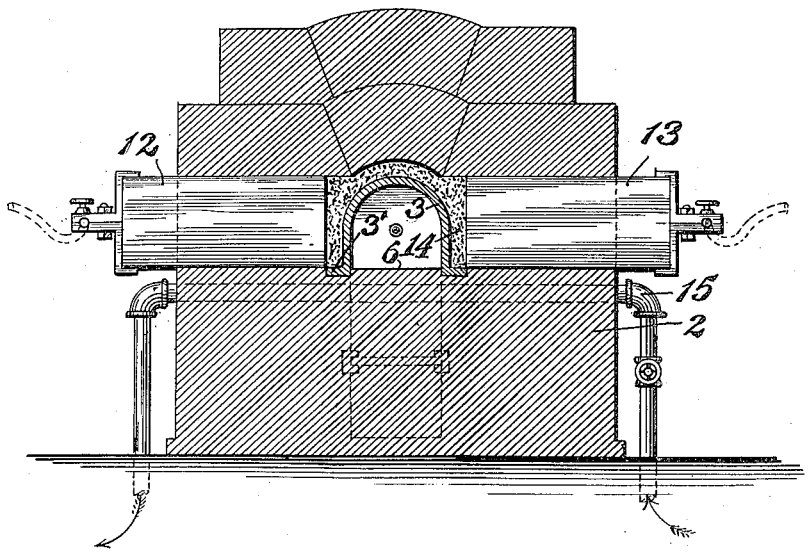
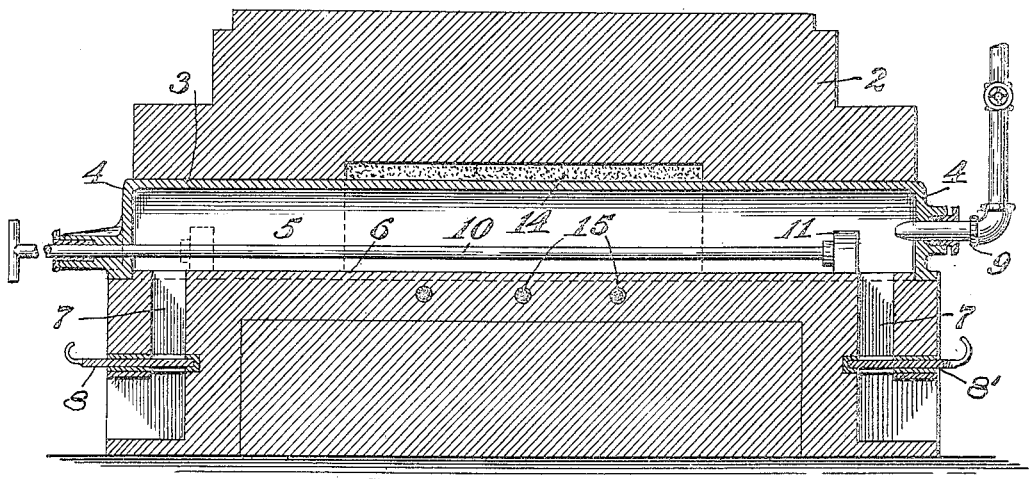

J. A. SNEE.
METHOD OF PRODUCING CARBON BLACK.
APPLICATION FILED SEPT. 20, 1911.
1,036,362.
Patented Aug. 20, 1912.
2 SHEETS—SHEET 2.
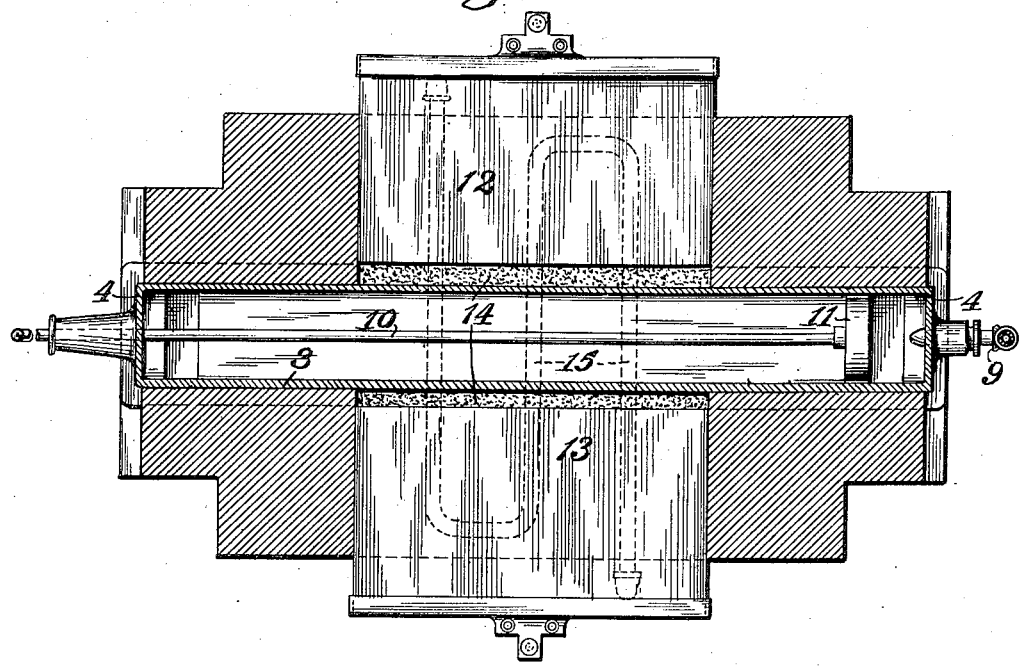
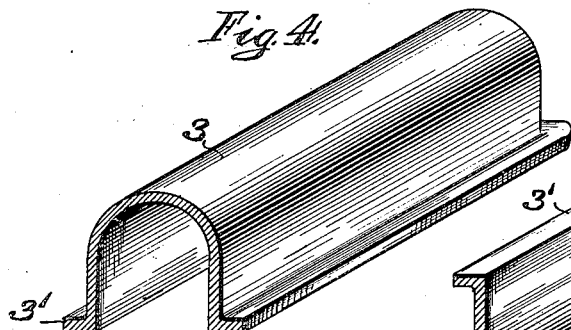
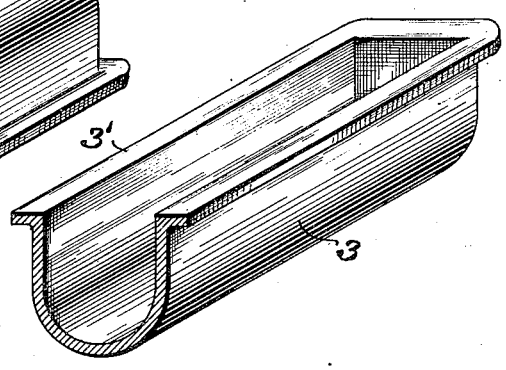

UNITED STATES PATENT OFFICE.

JOHN A. SNEE, OF WEST ELIZABETH, PENNSYLVANIA.

METHOD OF PRODUCING CARBON-BLACK.

1,036,362.   Specification of Letters Patent.   Patented Aug. 20, 1912.

Application filed September 20, 1911. Serial No. 650,444.

*To all whom it may concern:*

Be it known that I, JOHN A. SNEE, a resident of West Elizabeth, in the county of Allegheny and State of Pennsylvania, have invented certain new and useful Improvements in Methods of Producing Carbon-Black, of which the following is a specification.

This invention relates to the production of carbon or lamp black from hydrocarbon gas, as fully set forth hereinafter.

If the carbon black is permitted to remain in the presence of the heat necessary to dissociate all of it, it will coke or deteriorate, detracting greatly from its commercial value and impeding the operation of the decomposing apparatus. Heat of great intensity is necessary to thus completely decompose the hydrocarbon, and as the coking tendency is greater in higher than in lower temperatures, I have had to deal at once with the provision of a high heat and the prevention of deterioration. If the carbon black is permitted to remain in the decomposing zone for any appreciable time it will deteriorate under the high temperature at which I find it advantageous to operate.

Hence, one object herein is to provide for subjecting the material to the influence of a lower temperature while within the decomposing zone, this being accomplished by maintaining the floor or bottom surface of the chamber at lower temperature than that portion above the floor, so that the carbon black settles thereon immediately upon being formed, and from which it may be removed with reasonable deliberation unimpaired. The high heat utilized in recovering substantially all the carbon black has the further effect of fully calcining the product, so that the subsequent and separate calcining process now usually necessary in producing high grade carbon black is avoided.

A desirable form of apparatus for practising the invention is illustrated by the accompanying drawings, Figure 1 being a central longitudinal section of the same; Fig. 2 a vertical cross section, and Fig. 3 a sectional plan. Figs. 4 and 5 are sectional details of the refractory arch.

Referring to the drawings, 2 designates a furnace structure of brick or other material in which is incased the upright hollow arch 3, with the ends 4 thereof closed. The arch is constructed of a highly refractory material, such as alundum, and is preferably formed with no bottom, the decomposing chamber or retort 5 inclosed by the arch having its bottom surface 6 preferably of the material of the furnace structure. Opening downwardly from opposite ends of arch 3 are the flue-like outlets 7, controlled by valves or dampers 8, 8', respectively. The valved hydrocarbon inlet 9 is entered through one of the arch ends 4, while operating through the opposite end of the arch is rod 10 to which is secured a scraper 11 for scraping the carbon black from the bottom surface 6 into one or the other of the valved outlets 7.

For heating the retort I employ two electrodes 12 and 13 to which the terminals of a suitable electric circuit are connected. These electrodes are entered through recesses at opposite sides of the furnace structure 2, and are elongated in the direction of the length of the arch in order to heat a sufficiently large area of the latter, the electrodes being relatively thin or narrow vertically. The extremities of the electrodes are spaced from arch 3 by a narrow layer of high resistance material 14, preferably broken carbon, which extends upwardly around the arch from its base flanges 3'. With the requisite amperage this resistance material brings the arch 3 to a white heat which may range from 1,300 to 1,800 degrees centigrade, and although I prefer the temperature approximating that last mentioned the same may range downwardly to the lower temperature indicated, or even lower, and yet result in practically full decomposition so far as dissociating the carbon is concerned.

Owing to the form and construction of arch 3, which is a good heat conductor, it will be understood that the temperature of bottom surface 6 will be materially lower than the zone of which it forms the bottom, so that as the carbon black is formed and settles thereon the tendency of certain tarry substances contained in the carbon to decompose is immediately forestalled, and cementing which causes coking is prevented.

While the construction of the retort and the mode of heating are such that the retort bottom is maintained at lower temperature than the decomposing zone immediately above the bottom, I have provided for still further reducing the temperature of the bottom by embedding therein a pipe coil 15 through which water may circulate.

Damper 8 is opened sufficiently to permit the products to escape without accumulating pressure within the retort so that the decomposing process proceeds at substantially atmospheric pressure, this regardless of the head or pressure of gas admitted through inlet 9, which may be a few ounces or much greater, as desired.

While I prefer to heat the retort electrically and by the arrangement and location of the electrodes shown and described, I do not confine myself to such heating means, nor in fact to the use of electricity as the heating medium.

I claim:—

1. The method of producing carbon black consisting in introducing hydrocarbon gas into a highly heated zone and depositing within such zone the resulting carbon black on a surface of lower temperature than that portion of the zone in which the gas is decomposed.

2. The method of producing carbon black consisting in heating a retort to a higher temperature above its bottom than at its bottom, the heat of the upper portion of the retort being sufficiently high to dissociate a hydrocarbon and the heat of the retort bottom being of such relatively lower degree as to prevent coking of the precipitated carbon black, and introducing hydrocarbon gas into the retort.

3. The method of producing carbon black consisting in passing a stream of hydrocarbon gas horizontally through a highly heated flame-excluded zone of lower temperature at its bottom than above its bottom.

In testimony whereof I affix my signature in presence of two witnesses.

JOHN A. SNEE.

Witnesses:
GUSTAVE FERNIKES,
J. M. NESBIT.